United States Patent
Feseker et al.

(10) Patent No.: US 12,090,577 B2
(45) Date of Patent: Sep. 17, 2024

(54) DEVICE FOR SOLDERING

(71) Applicant: Siegfried Hofmann GmbH, Lichtenfels (DE)

(72) Inventors: Daniel Feseker, Lichtenfels (DE); Michael Deuerling, Lichtenfels (DE); Michael Förste, Lichtenfels (DE); Kai Fuhrmann, Lichtenfels (DE); Johannes Günther, Lichtenfels (DE); Benedikt Bechmann, Lichtenfels (DE); Heinz Nolden, Meisenheim-Glan (DE)

(73) Assignee: SIEGFRIED HOFMANN GMBH, Lichtenfels (DE)

( * ) Notice: Subject to any disclaimer, the term of this patent is extended or adjusted under 35 U.S.C. 154(b) by 0 days.

(21) Appl. No.: 17/618,606

(22) PCT Filed: Jun. 5, 2020

(86) PCT No.: PCT/EP2020/065580
§ 371 (c)(1),
(2) Date: Feb. 16, 2022

(87) PCT Pub. No.: WO2020/249474
PCT Pub. Date: Dec. 17, 2020

(65) Prior Publication Data
US 2022/0258265 A1    Aug. 18, 2022

(30) Foreign Application Priority Data

Jun. 14, 2019  (DE) ..................... 10 2019 116 290.4

(51) Int. Cl.
*B23K 3/00*    (2006.01)
*B23K 1/00*    (2006.01)
*B23K 1/015*    (2006.01)
*B23K 3/047*    (2006.01)
*B23K 101/42*    (2006.01)

(52) U.S. Cl.
CPC ............ *B23K 3/0478* (2013.01); *B23K 1/015* (2013.01); *B23K 2101/42* (2018.08)

(58) Field of Classification Search
CPC ........ B23K 1/008; B23K 2101/42; F27B 9/10
See application file for complete search history.

(56) References Cited

U.S. PATENT DOCUMENTS

| | | | |
|---|---|---|---|
| 10,537,031 B2 * | 1/2020 | Hillman | ............ H01L 21/67144 |
| 10,791,799 B2 * | 10/2020 | Regan | ..................... F26B 21/08 |
| 11,021,657 B2 * | 6/2021 | Iddir | ........................ F27D 7/02 |

(Continued)

FOREIGN PATENT DOCUMENTS

DE    102016222114    5/2018

OTHER PUBLICATIONS

PCT International Search Report (w/ English translation) for corresponding PCT Application No. PCT/EP2020/065580, mailed on Nov. 13, 2020, 5 pages.

*Primary Examiner* — Erin B Saad
(74) *Attorney, Agent, or Firm* — Dority & Manning, P.A.

(57) ABSTRACT

A device for soldering, in particular for reflow soldering, of at least one assembly, having a process chamber arrangement, comprises at least two process chambers for preparing a soldering method and/or for carrying out a soldering method and/or for post-processing a soldering method, wherein the at least two process chambers are arranged above one another, in particular in a stack-like manner.

16 Claims, 12 Drawing Sheets

(56) References Cited

U.S. PATENT DOCUMENTS

Figure 1:
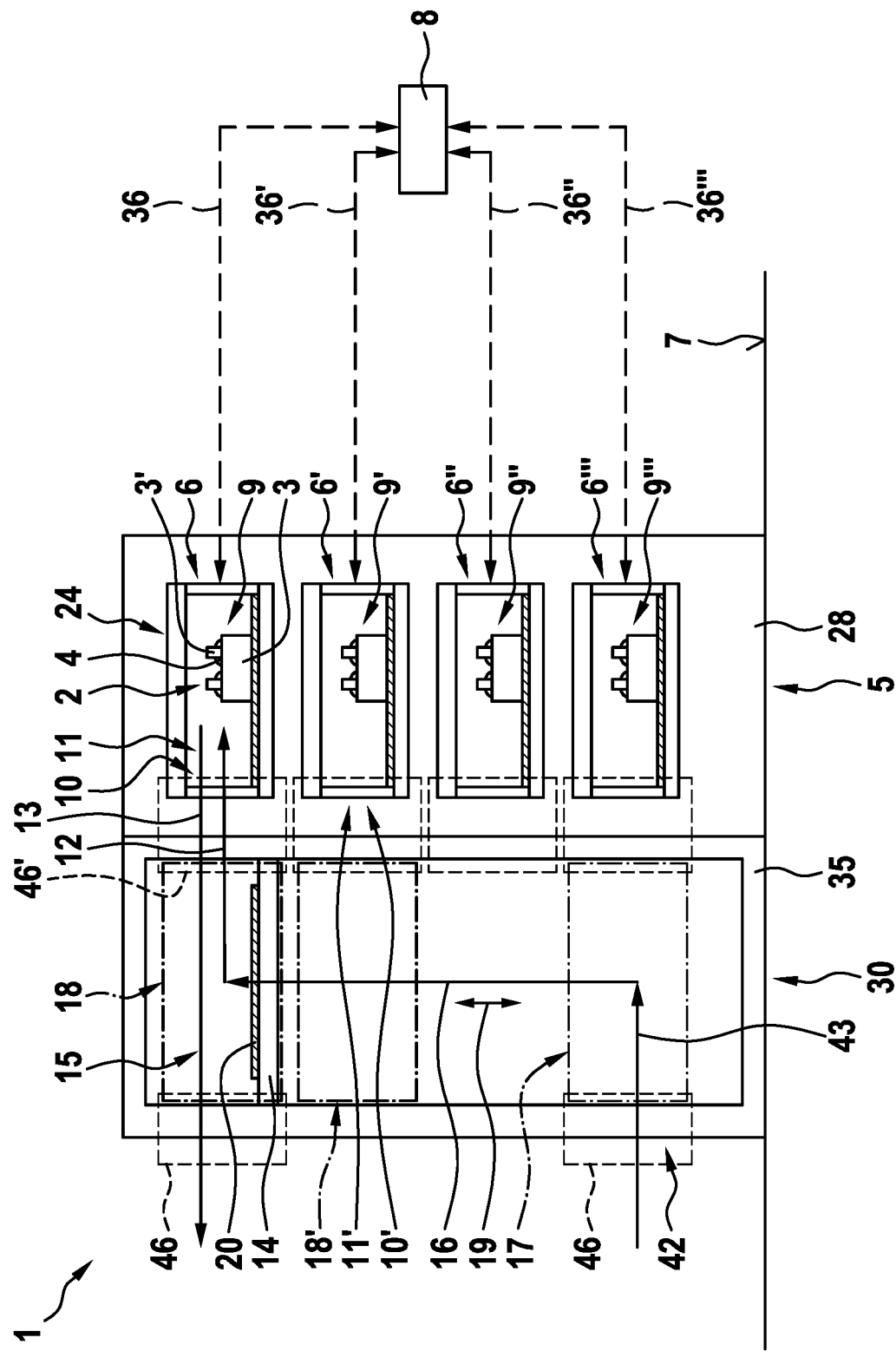

2001/0011197 A1\* 8/2001 White ................ H05K 13/0857
  700/121
2002/0001787 A1  1/2002 Kurtz et al.
2002/0146657 A1  10/2002 Anderson et al.

\* cited by examiner

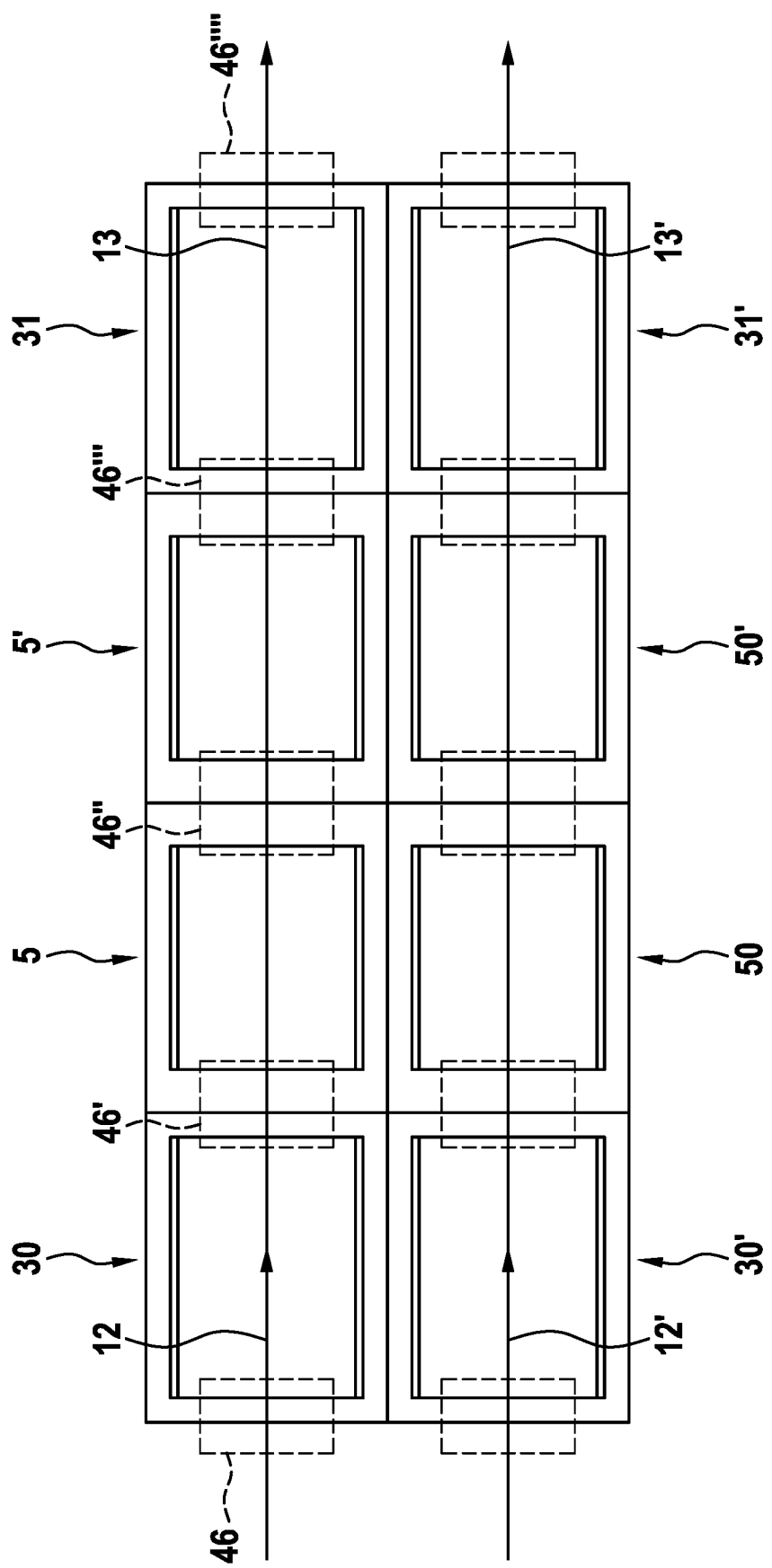

DEVICE FOR SOLDERING

The invention relates to a device for soldering, in particular for reflow soldering, of at least one assembly, having a process chamber arrangement. At least one assembly consisting of at least two components is introduced into the process chamber, and by applying thermal energy to the assembly, a bond is created, wherein a liquid phase arises due to melting of a solder or by diffusion at the boundary surfaces. The components are not usually melted in depth. A substance-to-substance bond of the components is typically formed in this case due to the melting and solidifying of the solder. The device used is adapted to achieve a defined tempering of the assembly and of the components and the solder in such a way that melting of the solder is achieved.

Pertinent devices for soldering of at least one assembly, comprising a process chamber arrangement, are basically known from the prior art. It is known in the prior art, for example, that in the course of reflow soldering of SMD components (e.g. thick-film hybrid circuits), tempering or soldering of the components takes place in such a way that the assembly is placed on a belt and passes via this belt in a straight line through a tunnel-like soldering oven. In this process, different temperature areas are maintained through the soldering oven on certain passage sections along the straight movement line. Here the components pass continuously and at uniform speed through the tunnel-like soldering oven. The reflow soldering can be based, at least in sections, on vapour phase soldering, convection soldering and/or infrared soldering.

The object of the invention is to specify a device that reduces the space required by the device in particular with regard to a simple, fast and low-cost measure and increases the possibilities in respect of the manner of the thermal impact on the assembly and/or components thermally influenced inside the device in economically justifiable conditions.

The object is achieved by a device for soldering at least one assembly according to claim 1. The claims dependent hereon relate to possible embodiments of the device.

The invention relates to a method for soldering, in particular for reflow soldering, of at least one assembly, having a process chamber arrangement comprising at least two process chambers for preparing a soldering method and/or for carrying out a soldering method and/or for post-processing a soldering method, wherein the at least two process chambers are arranged above one another, in particular in a stack-like manner. It is made possible by the two process chambers arranged above one another to subject a first assembly in a first process chamber and, in parallel time-wise, another assembly in a second process chamber arranged above the first process chamber to a soldering method process. It can be advantageous here to treat the process sub-steps of at least two assemblies treated in different process chambers with a time offset, in particular with a slight time offset. In other words, the tempering, e.g. the heating and/or the cooling, of the at least two assemblies takes place with a time offset. Due to the time offset, an assembly that has already been heated sufficiently can be transferred, wherein another assembly still has to be present in the process chamber for a certain timespan. The assembly to be soldered can comprise at least two components, for example, wherein a first component typically comprises an electrical and/or electronic unit, which is soldered onto a second, in particular electrical and/or electronic, component. The second component, onto which at least a first component is soldered, can be formed in the manner of a plate and comprise at least one printed conductor. Thus the second component can be formed as a printed circuit board or as a board to which one or more components or units are attached by a soldered connection. For this purpose a soldering flux, in particular a soldering paste, can be applied to at least one component prior to the actual soldering process, i.e. prior to the thermal impact on the assembly, for example. The components of the assembly that are bonded indirectly or directly to one another can be arranged or be capable of being arranged in this case, for example, even pointing in all three spatial directions on a surface of a basic component, i.e. e.g., a component is or can be soldered on an upper side, another component on a front side and yet another component on a lateral area of the basic component. Alternatively or in addition, a 3D printed circuit board can be used as part of the assembly. A soldering paste can comprise a soldering metal powder and a flux. The soldering flux is melted during tempering by the device, at least in sections. Following cooling of the soldering flux or following the hardening of the soldering flux melted at least in sections, a solid and/or rigid bond of the individual components and of the soldering flux of the assembly is formed.

The device according to the invention has at least two process chambers for carrying out at least a sub-step of the soldering method. The soldering method can be divided into preparatory steps of the soldering method, into steps of the soldering method carrying out the soldering method and into post-processing steps of the soldering method. Preparatory steps of the soldering method can be, for example: cleaning of at least one of the components to be soldered to one another, alignment and/or positioning of at least two components to be soldered to one another, deposition or application, at least in sections, of a soldering flux to at least one of the at least two components to be soldered to one another, thermal, optical and/or tactile detection of at least one of the components to be soldered to one another and/or pre-tempering of the assembly and/or of the soldering flux and/or transfer or handling of the at least one assembly from a non-working position to a working position located in a process chamber or a transfer or handling of an assembly in the reverse direction. Steps carrying out the soldering method can comprise the steps that are connected, in particular directly, to the creation of the substance-to-substance bond, thus, for example: (a) pre-heating of at least one component and/or a soldering flux and/or (b) tempering, in particular heating, of an assembly or of a soldering flux arranged on at least one component and/or (c) active or passive cooling of a soldering flux melted on or melted, at least in sections, and/or active or passive cooling of the assembly and/or component. Post-processing steps of a soldering method can comprise continuing tempering, i.e. renewed heating and/or active or passive cooling of the solidified soldering paste and/or of at least one component and/or of at least one assembly. The thermal, optical and/or tactile detection of the assembly connected to one another by the soldering process, at least in sections, can also constitute a post-processing soldering method step, for example. Regardless of whether the thermal, optical and/or tactile detection is provided as a preparatory step and/or as a post-processing soldering method step, the at least one detection means used for this can be arranged in or on at least one process chamber arrangement, in particular in at least one process chamber, and/or in or on at least one handling unit. For example, the thermal, optical and/or tactile detection can serve as an inspection system for monitoring and/or for control of the thermal effects on the assembly or the behaviour or progression of the assembly with reference to the thermal effect.

One aspect of the method is that at least one action is carried out for preparation of a soldering method and/or for carrying out the soldering method and/or for post-processing of the soldering method while the at least one assembly is placed in a process chamber of the device. The device according to the invention provides at least two process chambers, which are arranged above one another, in particular in a stack-like manner. Due to the fact that the at least two process chambers are arranged or formed lying above one another, an action affecting the soldering method can be carried out in two process chambers or in two process spaces and simultaneously a soldering method can be carried out with a smaller space requirement than in devices of the prior art. For example, two, three, four and/or five process chambers are arranged lying above one another. Due to the fact that the process chambers are stacked or arranged vertically, the space requirement needed e.g. in a production shop is reduced. Extension vertically (in the Z-direction) is mostly possible without restrictions, as the ceiling height of normal production shops is not usually utilised. Thus conventional reflow soldering ovens in particular display a substantially elongated and horizontal extension.

Reflow soldering, which is to be carried out optionally on the device according to the invention, relates to a soft-soldering method for soldering SMD (surface-mounted device) components, wherein the units or components are soldered by means of solderable connection faces directly onto another component (e.g. a circuit board). The assembly formed can also be termed a flat module. SMD components can generally be arranged on or attached to a component or a circuit board on one side or both sides.

With an arrangement of at least two process chambers above one another, these can be arranged or formed "congruent", for example, i.e. in the case of a projection of the boundary lines of the process chambers, the boundary lines coincide. Alternatively to this, at least one process chamber can be arranged or formed in relation to an adjacent process chamber lying offset above one another. Here the offset can comprise a fraction or an integer multiple of a width or a length of at least one process chamber. In particular, at least two, preferably all, process chambers of the device can have an identical width and/or an identical length and/or an identical height. In the case of process chambers constructed similarly and/or identically, at least in sections, components used for their formation can be used as common parts. At least two process chambers can be dimensioned in principle relative to one another according to a modular dimension and/or be arranged spaced from one another in a modular dimension. The modular dimension makes it possible to facilitate a space-saving arrangement of in particular process chambers that can be assembled in a modular manner or process chambers that can be factory-fitted.

The at least two process chambers can each have an interior delimited by wall sections. In this case the interior can have an opening at least on one side, preferably on two sides, which can be opened at least temporarily and through which at least one assembly can be introduced into the interior of the process chamber and removed from the interior of the process chamber. For example, at least one assembly, preferably at least two assemblies are placed simultaneously in a process chamber for thermal impact. The process chambers thus each comprise a process chamber body defining a spatial-physical shape due to walls or wall sections. The walls or the wall sections of the process chambers can consequently typically define the interior of the process chambers. The process chamber body can comprise an interior, which typically forms a delimited inner process chamber body volume due to the walls or wall sections. The at least one assembly can be introduced into the interior or into the process chamber body volume and is subjected there at least temporarily to heating and/or cooling. The assembly can be stationary at least during the thermal action on this at least one assembly arranged in the interior of the process chamber, i.e. the assembly does not perform any movement relative to the process chamber at least temporarily during the thermal impact. Alternatively or in addition, the at least one assembly placed in the interior of the process chamber can perform a continuous or discontinuous movement, at least in sections, in particular relative to the process chamber.

As well as the at least two process chambers arranged above one another, the device can additionally comprise other process chambers, wherein at least a portion of the other process chambers can be arranged next to a first and/or next to a second process chamber. In other words, a first process chamber can be arranged or formed in a first plane (first height level), for example, and a second process chamber in a second plane (second height level), the second plane lying on another height level compared with the first plane. Another, third process chamber is arranged or formed next to the first process chamber and therefore placed lying in the same plane or on the same height level as the first process chamber. For example, the at least one other process chamber can be arranged or formed behind and/or in front of and/or laterally next to a first process chamber.

It is possible that control and regulation of at least one process parameter present in an interior of at least one process chamber can be executed by at least one process parameter unit, in particular the pressure and/or temperature and/or atmosphere present in the interior of the at least one process chamber can be controlled or regulated by the process parameter unit. A targeted change in the conditions or process parameters prevailing inside the process chamber can thus be made by the process parameter unit. A defined excess pressure and/or a defined negative pressure and/or a vacuum can thus be implemented, for example, by the process parameter unit and/or by activating a process parameter variation means (e.g. activatable pump) operatively connected to the interior of the process chamber.

Alternatively or in addition, a change in the temperatures prevailing at least in sections in the interior of the process chamber can be achieved by the process parameter unit. In this case the process parameter unit itself or activation of a tempering means (e.g. electrical heating element and/or guide flaps for supplying or redirecting a tempered gas flow) can procure a defined temperature, at least in sections, in the interior of the process chamber, i.e. e.g. carry out heating or cooling to a target temperature.

It can also be provided alternatively or in addition that the process parameter unit varies the atmosphere prevailing in the interior and controls or regulates it to a target atmosphere. For example, a cooling gas can be introduced into the process chamber to cool the interior of a process chamber and thus to cool the at least one assembly located in the interior of the process chamber. To generate the cooling gas, a liquid cooling gas can be used, for example this is produced by mixing gaseous and liquid inert gas. Nitrogen, in particular liquid nitrogen (LN2), argon, helium and/or carbon can be used, for example, at least temporarily as an inert gas. The cooling gas introduced into the process chamber can be produced in a cooling apparatus arranged on the device side, in particular on the process chamber arrangement side. The cooling apparatus here can comprise a heat exchanger or a cooler, for example, as well as a fan for generating a cooling gas flow conducted into the process chamber. A cooling effect can be achieved, for example, in that liquid nitrogen used draws heat from the environment, here from the interior of the process chamber, in the course of its apparatus change and thus cools the process chamber and the at least one assembly located in the process chamber. Control and/or regulation of the process parameters in the process chamber can preferably take place such that adjustment or regulation of the pressure, the temperature and/or the atmosphere is implemented depending on the at least one assembly located in or to be introduced into the process chamber. It is thus enabled that the process parameter prevailing in the process chamber can be regulated specifically to the assembly introduced into the interior of the process chamber; expressed another way, at least one process parameter can be regulated directly to the assembly. Targeted tempering of the component surface and/or assembly surface can thus take place, for example. A target process parameter can also be set in the interior of the process chamber, e.g. by means of a control loop.

In one advantageous embodiment, it is provided that at least a first process parameter present in the interior of the first process chamber can be controlled and/or regulated via the process parameter unit independently of a second process parameter present in an interior of a second process chamber. The device can thus maintain different process parameters in different process chambers, in order thus to heat and/or cool assemblies in the respective process chambers independently of one another parallel in time or offset in time. Apart from tempering, the process parameter setting independently of process chamber also relates optionally to the respective process chamber atmosphere and/or the respective process chamber pressure. It can prove advantageous if a wall or wall section separating a first process chamber from a second process chamber has thermal insulation, so that alternate thermal influencing of adjacent process chambers is reduced or excluded. Due to a suitably activatable and/or efficient tempering means of a process chamber, as well as direct tempering of this process chamber it is possible to compensate for cross-influencing of this process chamber by an adjacent other process chamber (arranged above or laterally next to the first process chamber).

It is possible that the process chambers each have at least one insertion and/or removal opening, via which at least one assembly that is to be soldered and/or has been soldered can be inserted into the process chamber or removed from the process chamber via an insertion and/or removal movement. To this end the process chamber can have at least two openings arranged or formed through breaks in the wall and/or the wall sections, wherein the insertion movement can take place through a first opening and the removal movement through a second opening of the process chamber. Alternatively, the insertion and removal movement can take place through the same opening, in this case a single opening of a process chamber is sufficient.

It can be advantageous if the insertion movement for inserting an assembly into a process chamber takes place or runs parallel in time and/or place to the removal movement for removing an assembly from this process chamber, the insertion movement preferably being directed in the opposite direction to the removal movement.

The insertion and/or removal movement can be configured as a movement that is linear, at least in sections, and/or as a movement that is curved at least in sections, wherein the insertion and removal movement can be aligned parallel to one another, at least in sections. Alternatively, an insertion movement running linearly can enclose an angle relative to a removal movement running linearly.

Alternatively or in addition, it can be provided that the insertion movement for inserting an assembly into a process chamber and the removal movement for removing an assembly from this process chamber are not aligned in parallel, at least in sections. In this case the insertion movement and the removal movement can be formed linear, at least in sections, preferably completely, wherein at least the two linear sections of the insertion and removal movement enclose an angle not equal to 180°, an angle of 5° to 175° preferably being enclosed, an angle of 30° to 150° particularly preferably being enclosed, an angle of 60° to 120° most preferably being enclosed. For example, with an angle of 90° a process chamber can be designed in which an assembly can be inserted in a first direction and the assembly is removable from the process chamber in a direction running laterally thereto, i.e. at a right angle to the first direction. A handling structure for handling, in particular for filling and for removing the assembly, which is adapted to the free spaces present at the installation location of the device can thus be used. To this end the process chamber can be designed in such a way, for example, that the angle between the insertion movement and the removal movement is variable or adjustable in the aforesaid angular areas. In this case the walls and/or the wall section of the process chamber can be arranged variably. Alternatively or in addition, it can be provided that at least one assembly is led into and/or out of a process chamber in a direction perpendicular to the installation area of the device.

It is possible that the at least one insertion and/or removal opening of at least one process chamber can be closed by at least one closure element, at least in sections, in particular the at least one closure element closes the process chamber such that a temperature and/or pressure and/or atmosphere present in the interior of the process chamber is closed off relative to an area outside of this process chamber. It can be provided here, for example, that during the insertion and removal of an assembly into or from the interior of the process chamber, the closure element is opened temporarily or is partially opened. At least during the soldering process itself, i.e. during the thermal impact on the assembly and in particular on a soldering flux located on the assembly, the closure element can be closed or partly closed. By closing the process chamber the process parameters to be set there can be attained faster, more accurately and with a reduced energy outlay.

It can be provided optionally that at least one closure element is part of a lock-like and/or lock-shaped closure mechanism arranged on at least one opening, preferably on all openings. The lock-like closure mechanism permits an assembly to be guided through the opening of the process chamber provided with the lock mechanism while typically maintaining the process parameters prevailing in the interior of the process chamber with almost or entirely no adverse effects. For example, the closure mechanism has an outer and an inner closure element, wherein the inner closure element separates the interior of the process chamber relative to an intermediate space between a process chamber and an outer area of the process chamber. The outer closure element separates the intermediate space from the outer area of the process chamber. With a structure of this kind it can be made possible by alternate opening and closing of the inner and outer closure element and by a movement of the assembly coordinated thereto to transfer the latter without causing a substantial impairment of the process parameters prevailing in the interior of the process chamber. Thus a transfer of the assembly out of or into the interior of the process chamber while maintaining and/or at least slightly impairing a temperature and/or pressure and/or atmosphere prevailing in the interior of the process chamber can be achieved, for example, with only a slight energy outlay despite actuation of the lock-like closure mechanism.

The loading and/or emptying or the introduction and/or removal of the assembly from the process chamber can take place, at least in sections, preferably completely manually or automatically. Manual removal can comprise in this case, for example, an introduction and/or removal of the at least one assembly controlled by a worker by means of a manually controlled robot.

It can be provided, for example, that at least one conveying device comprising at least one conveying means is used to execute a conveying movement, wherein an assembly that is to be soldered and/or has been soldered is transferable by means of the conveying means from a first position to a first transfer position associated with a first process chamber, in particular the conveying movement of the conveying means comprises a movement component in a vertical direction. An assembly can thus be brought using the conveying means from a first, e.g. lower-lying position, to a higher transfer position. The conveying means can be designed for this purpose in the manner of an elevator, for example. Alternatively or in addition, the conveying means can be designed as a crane or as a height-displaceable platform. The transfer position is arranged, for example, as at the same vertical height as the process chamber associated with the transfer position. After reaching the transfer position, the assembly can thus be moved by a substantially or exclusively horizontal displacement into a working position located in the interior of the process chamber.

Alternatively or in addition to a conveying device, the device can comprise at least one transfer device, comprising at least one transfer means, for executing a transfer movement, wherein at least one assembly that is to be soldered and/or has been soldered is transferable by means of the transfer means (a) from a non-working position, in particular a transfer position, to a first working position lying in the interior of a first process chamber and/or (b) from a first working position lying in the interior of a first process chamber to a non-working position, in particular a transfer position, and/or (c) from a first working position lying in the interior of a first process chamber to a second working position lying in the interior of a second process chamber. For example, the transfer movement comprises a movement component in a horizontal direction. The transfer device serves, in other words, for further displacement of an assembly moved e.g. manually or by the conveying device into a transfer position, away from the transfer position to a working position and/or from a working position to a transfer position and/or from a first working position to another working position.

To transfer the assembly, the transfer device and/or the transfer means can execute a movement relative to the process chamber. The assembly is typically lying on the transfer means and/or gripped by gripping elements of the transfer means and executes a joint movement with the transfer means relative to the process chamber. On reaching the destination location, the connection of the transfer means and the process chamber can be revoked, if applicable the transfer means can engage, at least temporarily, in the process chamber and following deposition or pick-up of the assembly can leave the process chamber again. Alternatively or in addition, the transfer means can form a part of the process chamber and/or of the handling unit or be integrated into the process chamber and/or into the handling unit. It can also be provided that at least two process chambers arranged consecutively, seen in the process direction of the at least one assembly, each comprise a transfer means, wherein the two transfer means facilitate a transfer of the at least one assembly from a first to another process chamber, in particular a vertical movement of the at least one assembly taking place in this case.

The conveying device can carry the assembly in a supporting and/or gripping manner, for example, at least in sections. In the case of support, the conveying device can comprise a storage area, in particular a storage surface. In the case of gripping, the conveying device can comprise gripping and/or clamping means, by means of which the assembly can be gripped or held by the conveying device. The conveying device can generally enter into a temporary positive and/or frictional connection with the assembly.

To enable a movement of the assembly (a) onto the conveying means and/or away from the conveying means, it may prove advantageous if the conveying means comprises a movement unit or a transfer means, which enables a movement of the assembly relative to the conveying means. For example, the movement unit or the transfer means can be designed as a conveyor belt arranged on a storage area, in particular a storage surface, of the conveying means, or as a conveyor chain. By e.g. deposition of an assembly onto the movement unit, in particular onto the conveyor belt, the assembly is carried by the movement unit and can be displaced relative to the conveying means. The movement unit can be designed variably, so that this is adaptable, manually or automatically, to differently geometrically formed components and/or assemblies and/or to a different number of components and/or assemblies to be moved simultaneously. Thus a change of the product to be soldered or the assembly to be soldered on the device can be accompanied by an adjustment of at least parts of the movement unit, for example.

It can be provided that the conveying device and the transfer device are realised in a common structural unit, i.e. e.g., that the conveying means and the transfer means are designed, at least in sections, as an in particular common body or as an in particular common unit.

In a preferred embodiment, the conveying device and/or the transfer device is or are arranged in a handling unit, wherein the handling unit is at least temporarily connectable or connected to the process chamber arrangement. The handling unit can comprise a housing at least enclosing the substantial volume of the handling unit, wherein the housing thus forms in particular the spatial-physical form of the handling unit and defines this in particular by walls or wall sections. The conveying means and/or the transfer means, for example, can be supported movably in the interior of the housing and thus in the interior of the handling unit, wherein an at least temporary removal from the main extension volume of the handling unit can optionally be provided for the conveying means and/or the transfer means. The conveying means and/or the transfer means typically move, however, at least mainly and/or exclusively within the main extension volume of the handling unit formed by the housing.

The housing of the handling unit can have at least one opening, through which an assembly can be guided from a point located outside of the handling unit to a point located inside the handling unit or vice versa. For example, the handling unit comprises a first opening for introducing assemblies that are to be soldered or have been soldered into the handling unit, and a second opening for guiding the assembly from the handling unit to an interior, in particular to a working area, of a process chamber. In principle, following its at least thermal effect inside the process chamber, the assembly can cover the supply path in reverse for removal. Alternatively it can be provided that the handling unit has a third opening through which an assembly, following its transfer from the process chamber to the handling unit, can be guided out of the handling unit to a downstream destination. For example, the assembly can be removed or guided through the third opening manually or automatically out of the handling unit.

The handling unit can be formed as a mobile transport system, in particular as a driverless mobile transport system (FTS). At least one assembly that has been or is to be soldered is preferably transportable by the mobile transport system from a first location remote from the device to a second location close to the device. It is possible that a mobile transport system simultaneously transports a plurality of assemblies that are to be soldered or have been soldered as grouped assemblies (e.g. magazine). An assembly carrier, for example, in or on which a plurality of assemblies can be arranged in a defined orientation and/or position relative to one another, can be used for this. An assembly carrier can be provided optionally with vibration damping means, which enables vibration-damped mounting of the assemblies on a transport system. Acceleration acting on the assemblies on account of the travel movement can thus be damped. Accelerations of this kind can result in particular in the event of travelling over potholes or similar. In this case the handling unit can be fastened non-detachably, i.e. not non-destructively detachably, or detachably on the mobile transport system. For example, the handling unit is connected via fixing means (e.g. screws) detachably to the transport system. The transport system and/or the handling unit can also comprise a coupling unit, which makes it possible to connect and/or detach the transport system to/from the handling unit manually or automatically.

The transport system can typically be used to transport at least one assembly, in particular several assemblies, and/or one handling unit.

Alternatively or in addition, parts of the handling unit and/or parts of the process chamber arrangement can be enclosed, at least in sections and/or temporarily, by a common housing. Expressed another way, the handling unit and the process chamber can be designed as a common unit, at least in sections. For example, the process chamber arrangement forms a first geometrical body and the handling unit another geometrical body, wherein the two geometrical bodies are connected to one another, in particular connected detachably to one another. In this configuration the handling unit should be seen as a stationary unit, whereas a handling unit displaceable via e.g. the transport system, at least in sections, can be understood as a mobile handling unit.

In another optional embodiment, at least two handling units, each comprising at least one conveying device and/or a transfer device, can be connectable or connected to the process chamber arrangement. The supply of an assembly that is to be soldered or has been soldered to the at least one process chamber preferably takes place via a first handling unit, and a removal of the assembly that is to be soldered or has been soldered from this process chamber takes place via a second handling unit. Alternatively, the at least two handling units connectable or connected to the process chamber arrangement can each facilitate supply and removal of the assembly. In this case the two handling units can assume, at least temporarily, the handling of the assemblies for the same process chambers and/or, at least temporarily, for different process chambers independently of one another.

The at least two handling units can be arranged or formed on two opposing sides of the process chamber arrangement. Alternatively or in addition, at least one handling unit can be arranged or formed lying laterally around the corner on the process chamber arrangement relative to another handling unit.

Arranged inside the at least one process chamber and/or on the conveying means and/or on the transfer means there can be at least one holding means, for example, which is adapted to hold the assembly that is to be soldered and/or has been soldered positively and/or frictionally. In this case at least one holding means can be formed as a gripping means provided with at least one gripping element. Alternatively or in addition, the holding means can hold the assembly, at least in sections, by means of clamping means or connect to the assembly in a clamping manner. The holding means, in particular the clamping means, can be adaptable manually or automatically to changing geometries and/or to a different number of assemblies to be held at the same time. In other words, the holding means can thus be adaptable to an assembly size or a product size.

In another advantageous optional configuration of the device, it can be provided that at least two process chamber arrangements, each comprising at least two process chambers arranged above one another, in particular in a stack-like manner, are connected to one another, the process chambers of the first process chamber arrangement and the process chambers of the second process chamber arrangement preferably being oriented parallel to one another. In this case, a first process chamber of a first process chamber arrangement and another process chamber of a second process chamber arrangement can be arranged or formed on a first, common height level and a second process chamber of the first process chamber arrangement and a second other process chamber of the second process chamber arrangement can be arranged or formed on a second, common height level. Thus without having to execute a vertical movement, an assembly located in the first process chamber can be transferred by horizontal displacement to the other process chamber of the second process chamber arrangement. The same applies to an assembly located in the second process chamber of the first process chamber arrangement, which assembly is transferable by, in particular exclusive, horizontal displacement to the second other process chamber of the second process chamber arrangement.

It can optionally be provided that a first handling unit for supplying assemblies to the first or second process chamber is arranged on the first process chamber arrangement and a second handling unit for removing assemblies from the other or the second other process chamber of the second process chamber arrangement is arranged on the second process chamber arrangement.

At least one closure element and/or a lock-like closure mechanism can be arranged between the first and the other process chamber and/or between the second and the second other process chamber. With a closure mechanism of this kind, influencing of the process chambers arranged adjacent to one another (first and other process chamber or second and second other process chamber) and of their interiors is reduced or prevented.

In another optional embodiment, it can be provided, for example, that the device comprises (a) an input device for entering information to a control unit on the device side and/or (b) an output device for outputting information to an operator and/or a control unit on the device side. Through the input unit, e.g. (I) control and/or regulation of the process parameter unit and/or (II) control and/or regulation of the transfer means and/or (III) control and/or regulation of the conveying means can take place. Alternatively or in addition, information relating to (i) the process parameters, (ii) the process parameter unit, (iii) the position and/or orientation of the transfer means and/or (iv) the position and/or orientation of the conveying means, for example, can be displayed or communicated to an operator of the device and/or to a higher-level data system (e.g. a production network) by the output device.

As well as the device for soldering, the invention also relates to a process chamber arrangement for a device described herein and/or a method for operating a device described herein for soldering an assembly, comprising the following method steps: (a) provision of at least one assembly, (b) introduction of at least one assembly into an interior of a process chamber, (c) carrying out a soldering method in an interior of at least one process chamber, (d) removing the assembly from the interior of the process chamber after carrying out the soldering method. The provision of the at least one assembly can comprise here, for example, picking up an assembly from a system or from a supplying neighbouring installation. The removal of the at least one assembly can comprise, for example, a transfer of the at least one assembly to a downstream system or to a receiving neighbouring installation.

During the execution of the soldering method in an interior of at least one process chamber, the at least one assembly located in the interior of the process chamber can be stationary, i.e. execute no movement relative to the process chamber at least temporarily or entirely.

It is possible that the execution of the soldering method comprises heating of the at least one assembly arranged in the interior of the process chamber, wherein following heating of the at least one assembly, the at least one assembly is subjected to a cooling process in the process chamber or following transfer of the at least one assembly to another process chamber. For example, the at least one assembly is heated in a first process chamber and transferred directly or indirectly following the heating in the first process chamber to another process chamber and there subjected to active or passive cooling.

With the present device it is possible for several assemblies, e.g. two, three and/or four assemblies, to be transferred simultaneously via the conveying device, in particular the conveying means, and/or via the transfer device, in particular the transfer means. Alternatively or in addition, several assemblies, e.g. two, three and/or four assemblies, can be arranged simultaneously inside a common process chamber and can be simultaneously heated and/or cooled, at least in sections.

It is optionally possible that the device is used for a series application for soldering the assemblies. At least 75, preferably at least 150, particularly preferably at least 220, most preferably at least 350 assemblies per hour can typically be soldered using the device. The number of assemblies per hour can be indicated, for example, as PCBs/h. This performance data can be achieved, for example, when using 4 process chambers used as ovens or as heating devices. These four ovens or heating devices can be combined or paired with respectively connected cooling process chambers. The assemblies considered in this case can have a Eurocard format, which typically has a length of 230 mm to 270 mm, in particular a length of 250 mm, and a width of 175 mm to 225 mm, in particular a width of 200 mm.

At least during the thermal impact on the at least one assembly inside the process chamber, the assembly can be stationary, i.e. execute no movement relative to the process chamber. This concept in particular makes it possible to execute even small batch sizes, i.e. batch sizes smaller than 100, preferably batch sizes smaller than 35, particularly preferably batch sizes smaller than 10, most preferably a batch size equal to 1, in economical conditions or to subject them to a soldering process. For example, simultaneous handling or simultaneous soldering of assemblies with different batch sizes is made possible, in this case the batch size differences can differ between at least two assemblies at least by the factor 4, preferably at least by the factor 10, particularly preferably at least by the factor 100, particularly preferably at least by the factor 1000.

All advantages, details, implementations and/or features of the device according to the invention are transferable or to be applied to the process chamber arrangement according to the invention and/or to the method according to the invention.

Figure 2:
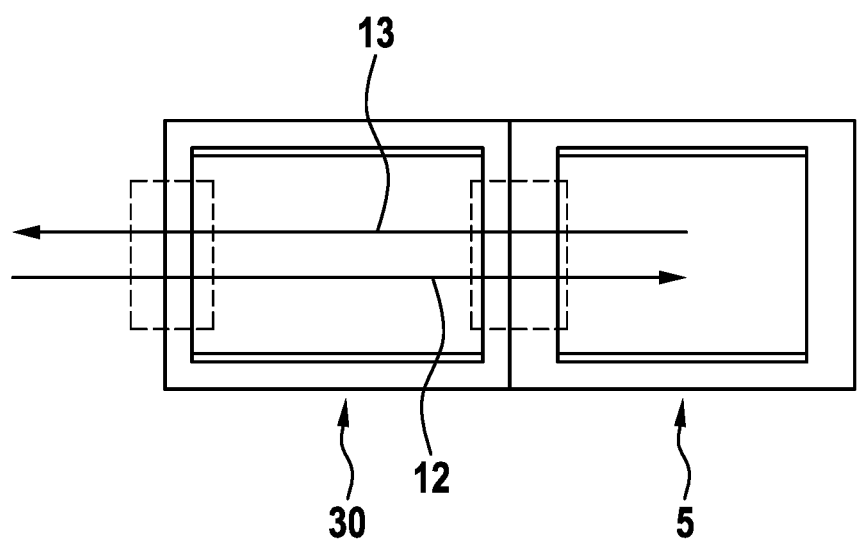
Figure 3:
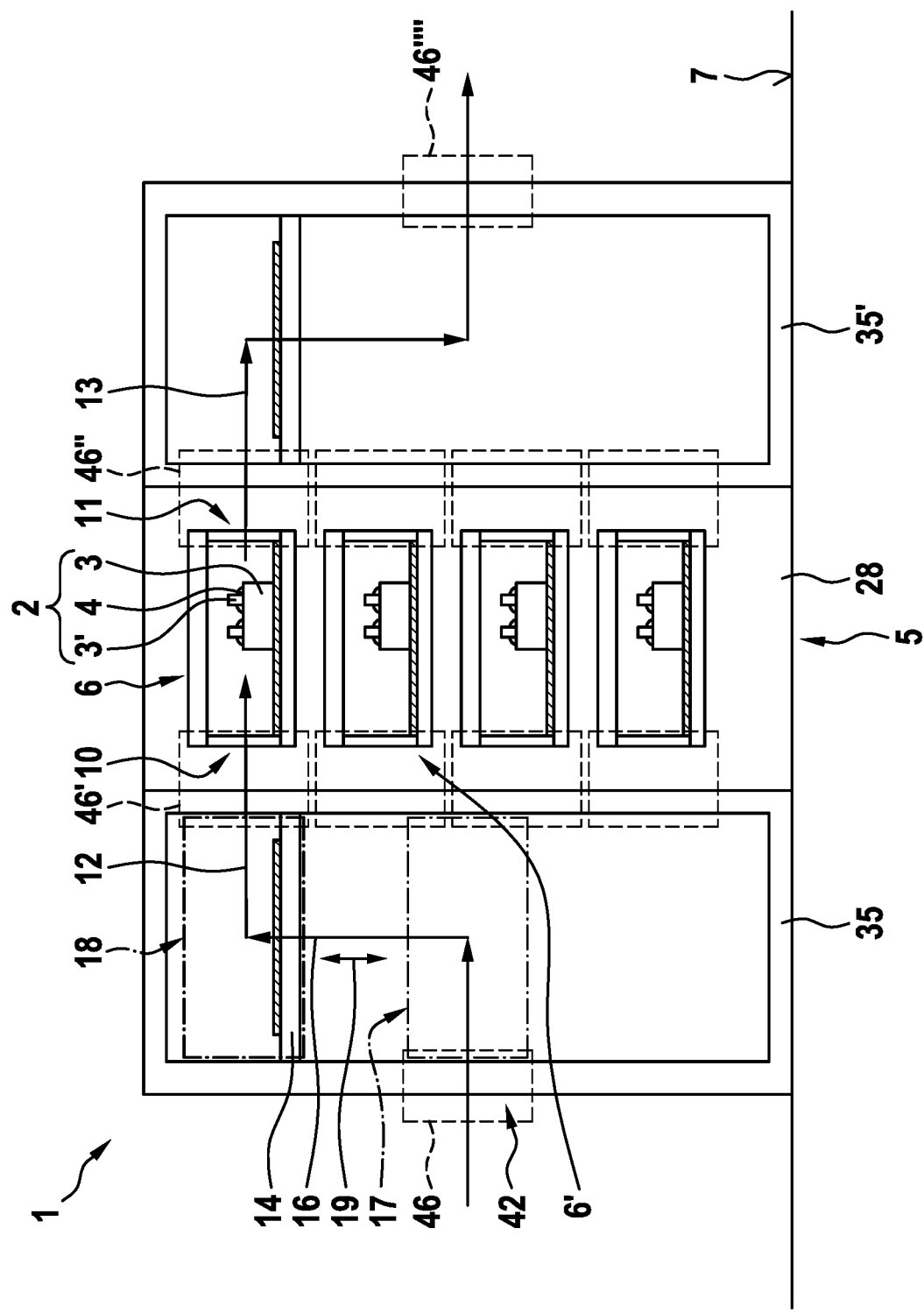
Figure 4:
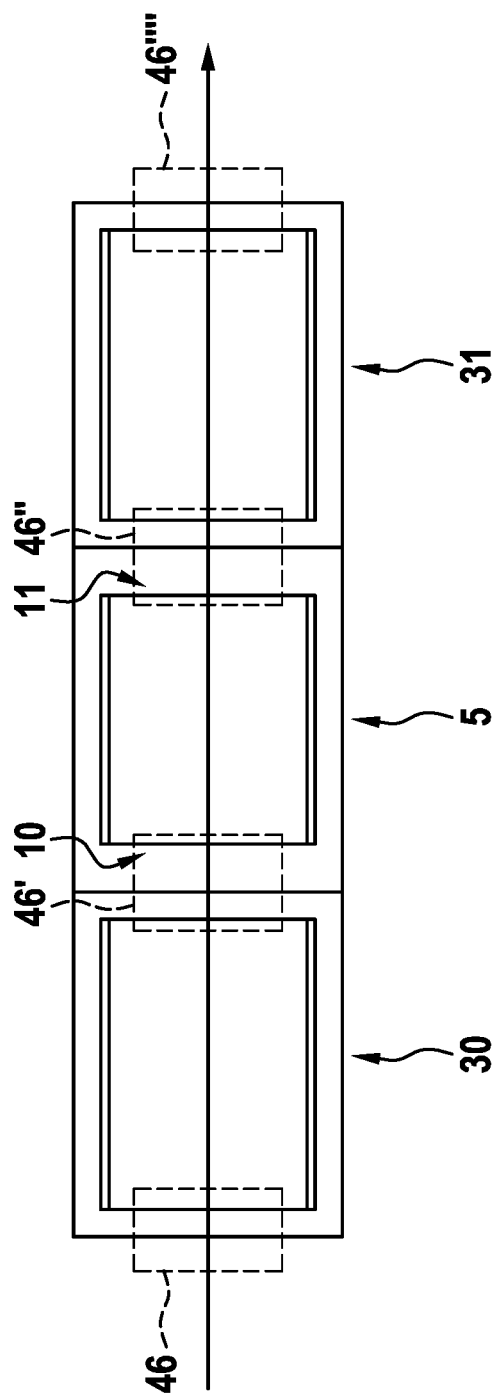
Figure 5:
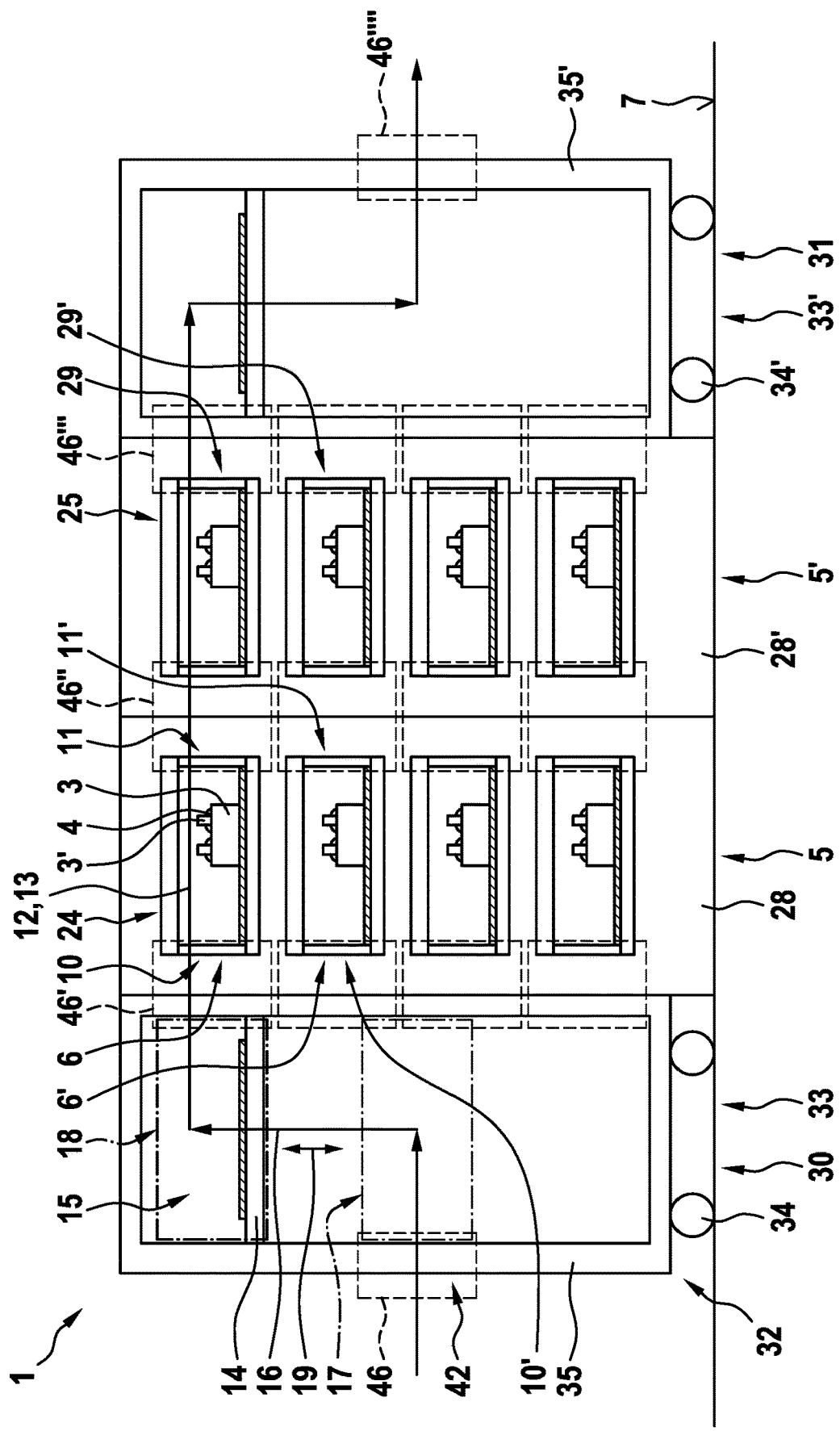
Figure 6:
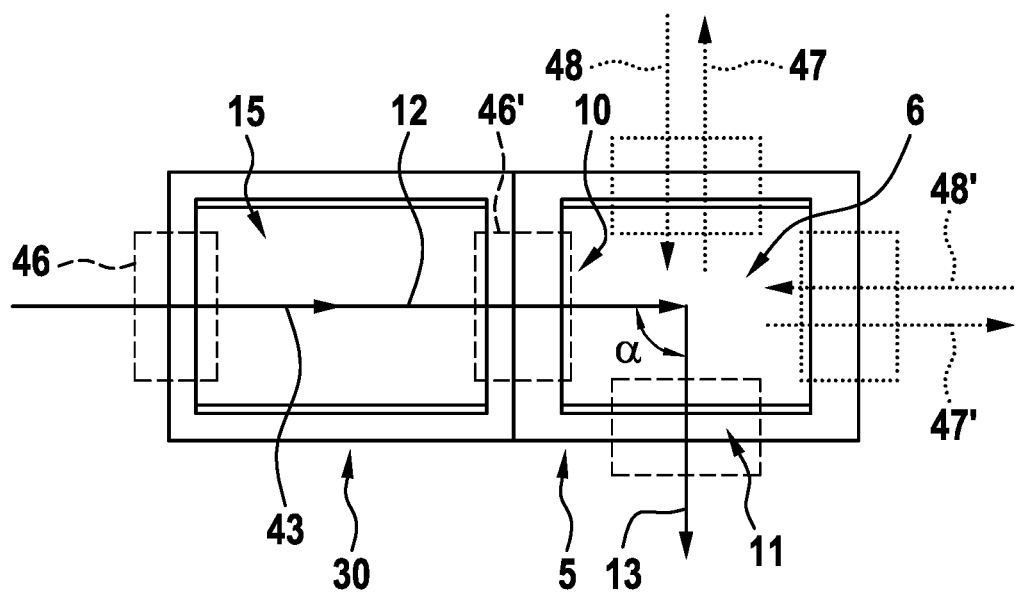
Figure 7:
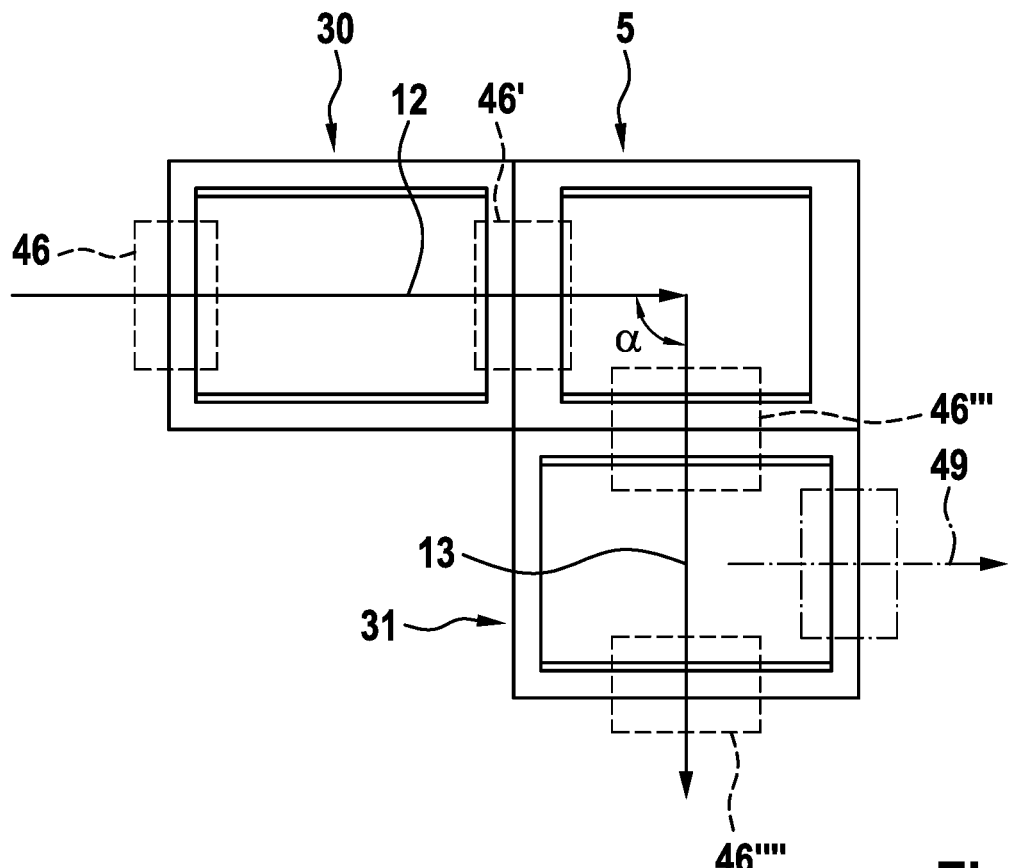
Figure 8:
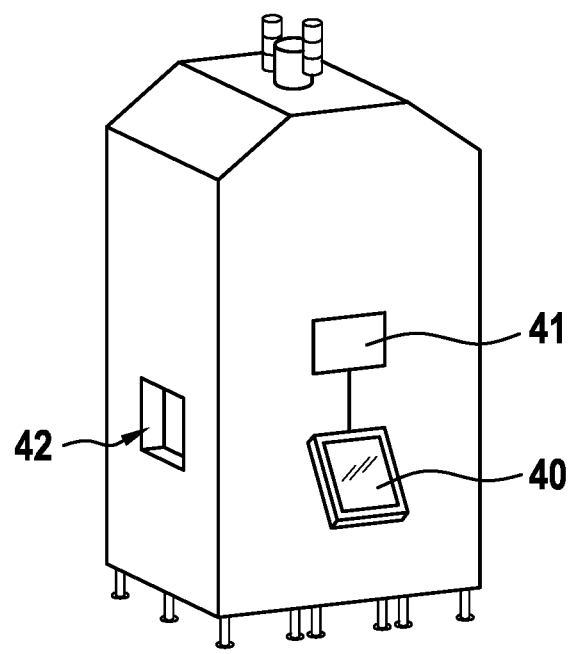
Figure 9:
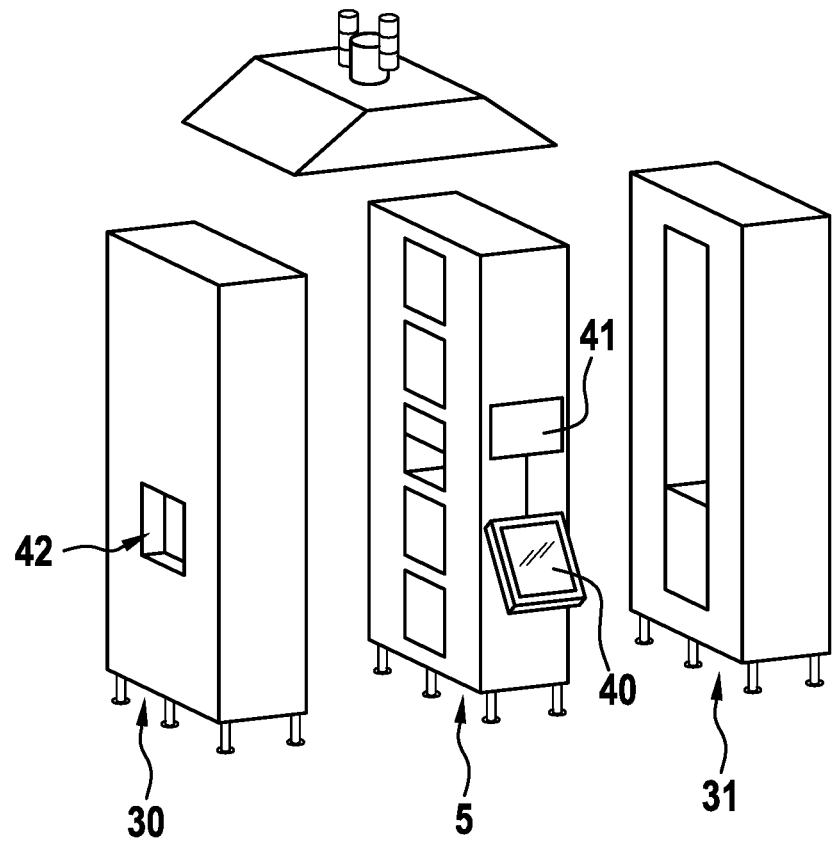
Figure 10:
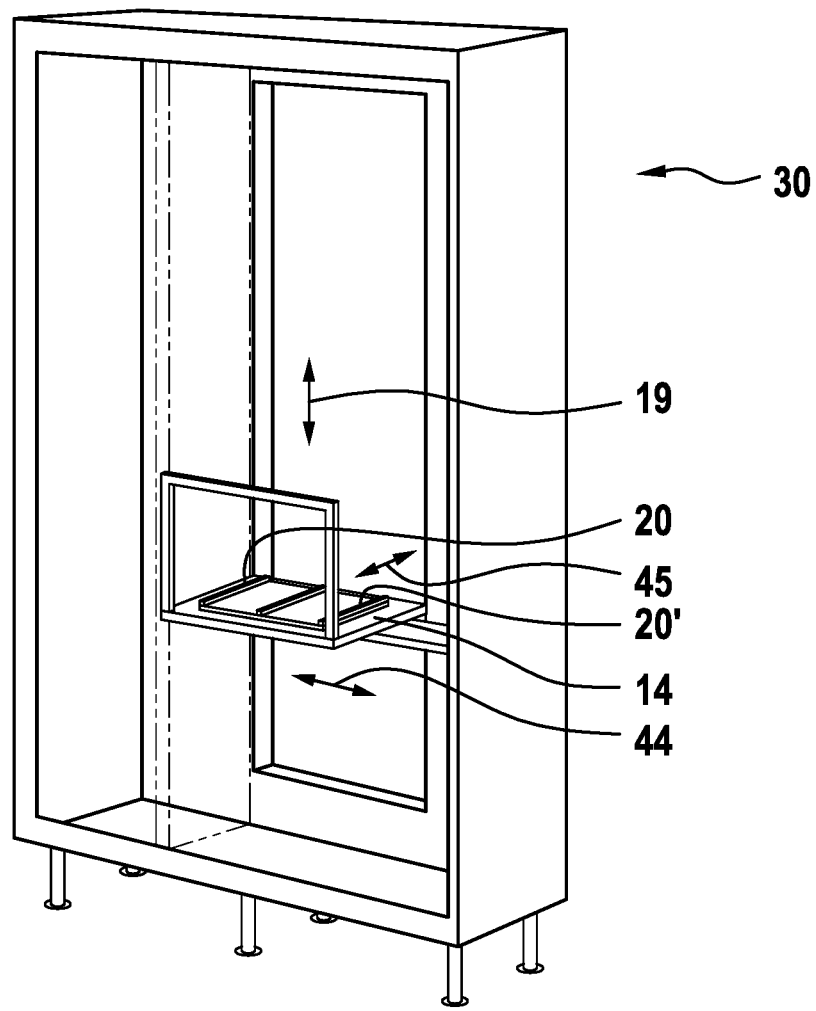
Figure 11:
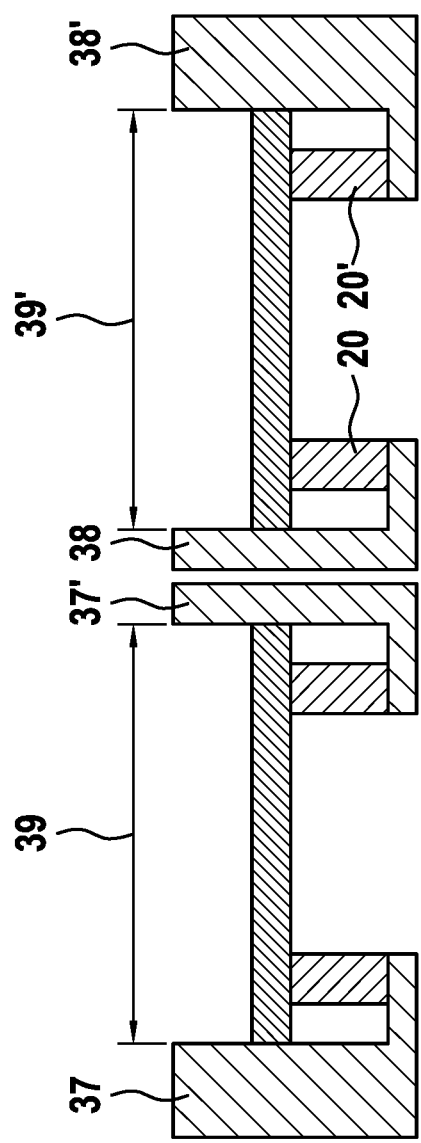
Figure 12:
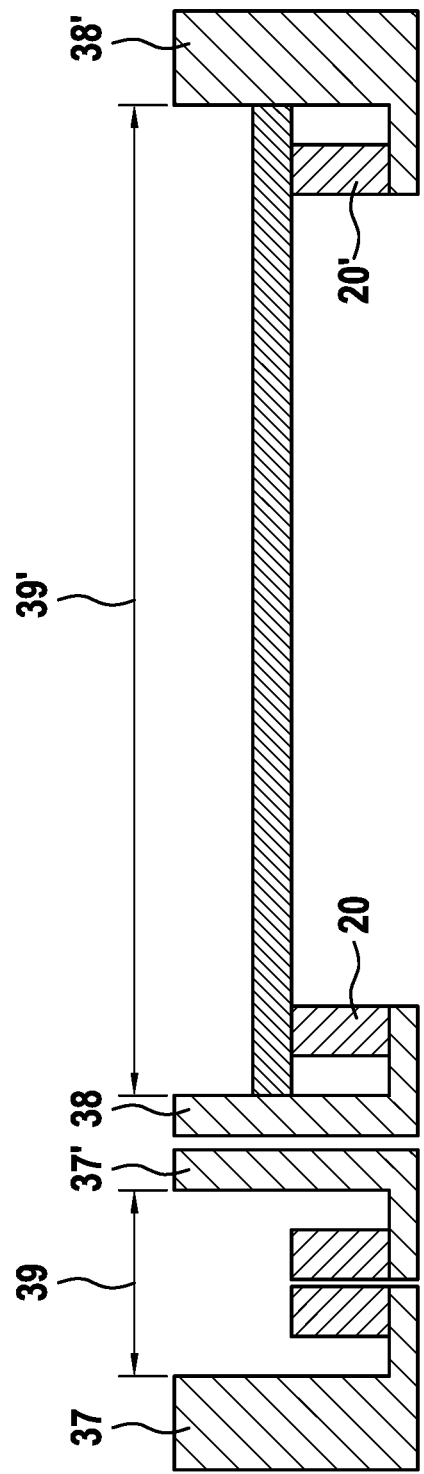
Figure 13:
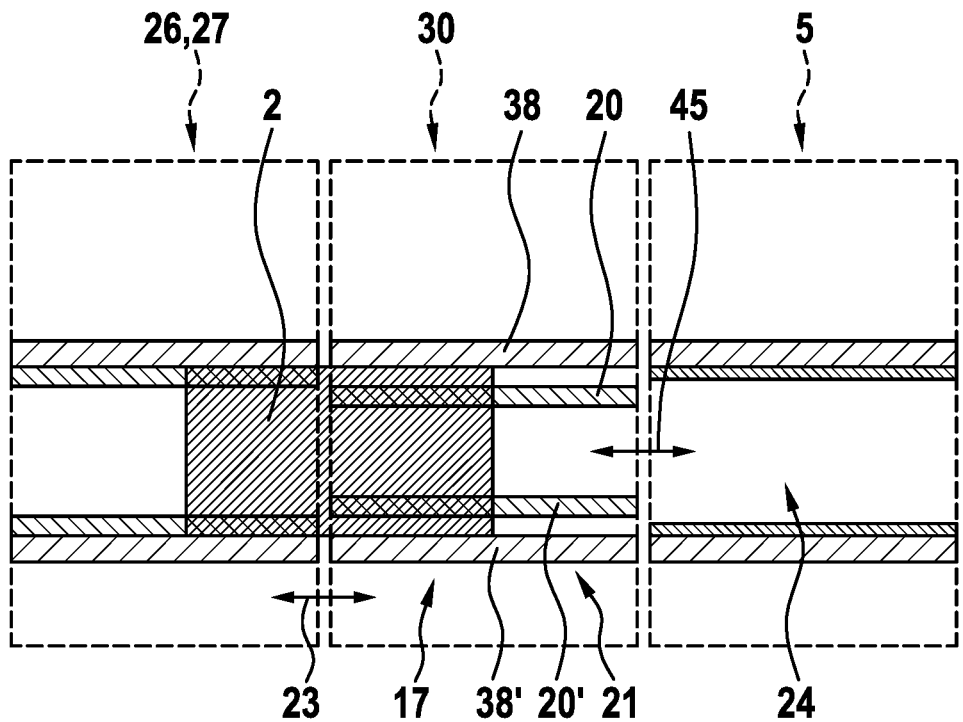
Figure 14:
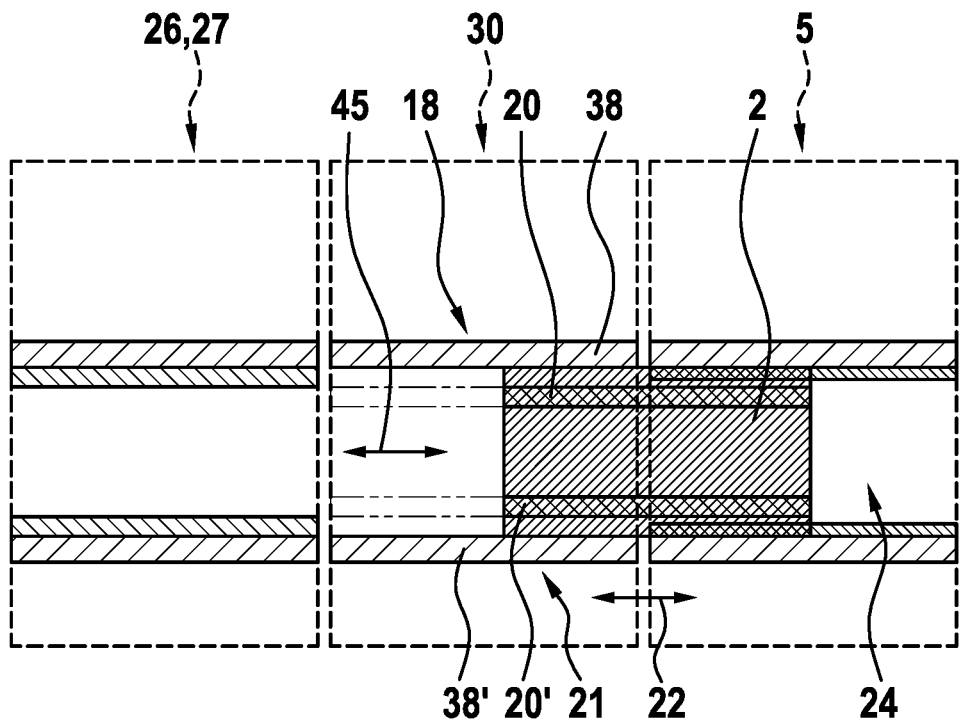
Figure 15:
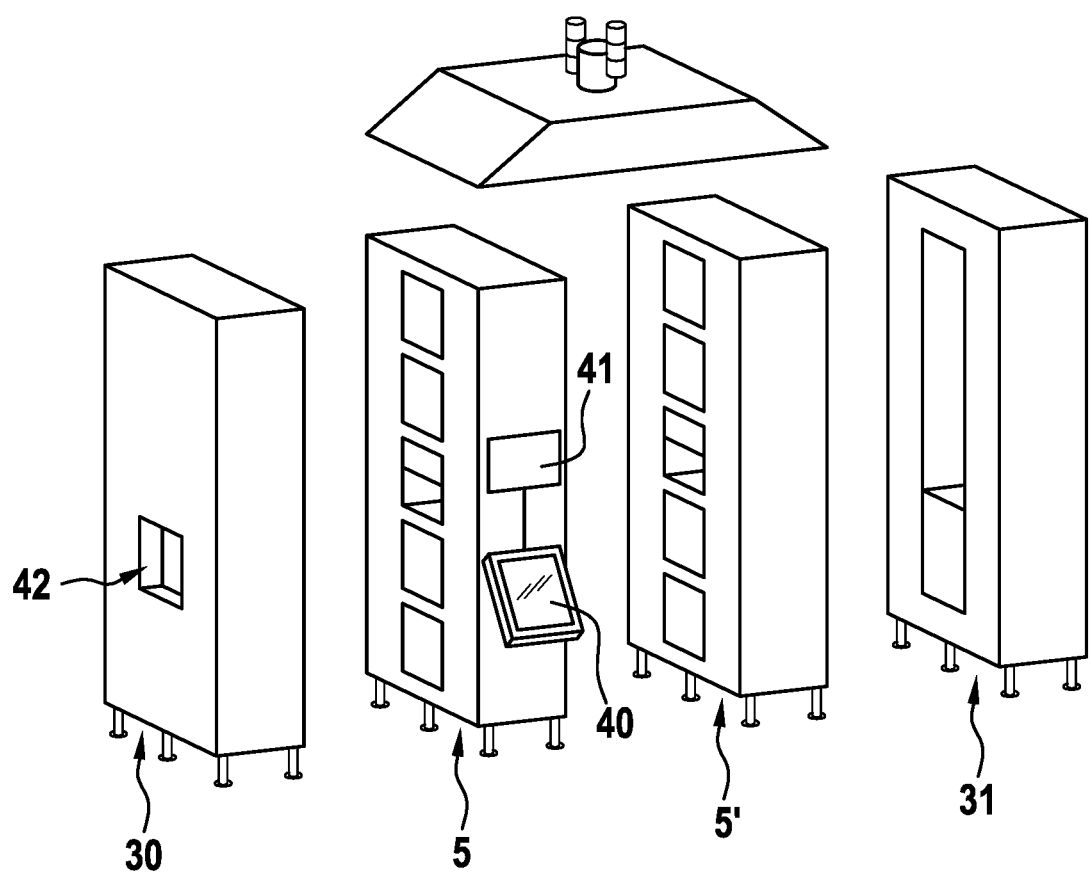

The invention is explained in greater detail with reference to exemplary embodiments in the drawings. These show:

FIG. 1 a schematic diagram of a device according to an exemplary embodiment in the frontal view;

FIG. 2 a schematic diagram of a device according to FIG. 1 in the plan view;

FIG. 3 a schematic diagram of a device according to an exemplary embodiment in the frontal view;

FIG. 4 a schematic diagram of a device according to FIG. 3 in the plan view;

FIG. 5 a schematic diagram of a device according to an exemplary embodiment in the frontal view;

FIG. 6 a schematic diagram of a device according to an exemplary embodiment in the plan view;

FIG. 7 a schematic diagram of a device according to an exemplary embodiment in the plan view;

FIG. 8 a schematic diagram in perspective of a device according to an exemplary embodiment;

FIG. 9 a schematic diagram in perspective of a device according to FIG. 8 in a representation disassembled into device subgroups;

FIG. 10 a schematic diagram in perspective of a handling unit according to an exemplary embodiment;

FIG. 11 a schematic diagram of a guide means according to an exemplary embodiment in the lateral view;

FIG. 12 a schematic diagram of a guide means according to an exemplary embodiment in the lateral view;

FIG. 13 a schematic diagram of a device according to an exemplary embodiment in the plan view;

FIG. 14 a schematic diagram of a device according to an exemplary embodiment in the plan view;

FIG. 15 a schematic diagram in perspective of a device according to an exemplary embodiment in a representation disassembled into device subgroups;

FIG. 16 a schematic diagram of a device according to an exemplary embodiment in the plan view.

A device 1 for soldering, in particular for reflow soldering, of at least one assembly 2 is shown in the figures. The assembly 2 here comprises at least two components 3, 3', wherein a first component 3 is formed as a circuit board and the second component 3' is formed as an electronic or electrical unit to be connected and fixed on the circuit board, in particular the second component 3' is an SMD component. In the area, in particular in the direct contact area, of the components 3, 3', a soldering flux 4, e.g. a soldering paste, is applied, which liquefies under thermal influence or during heating and hardens following a cooling phase.

The device 1 has a process chamber arrangement 5, which comprises, for example, four process chambers 6, 6', 6", 6''' for preparation of a soldering method and/or for carrying out a soldering method and/or for post-processing of a soldering method. At least two of the process chambers 6, 6', 6", 6''' are arranged in this case lying above one another and in particular in a stack-like manner. In the embodiment shown by way of example, the individual process chambers 6, 6', 6", 6''' lie congruent above one another, i.e. in a projection of the contour shape or edges onto an installation surface 7 of the device 1, the boundary lines or edges coincide, at least in the plan view.

Control and/or regulation of process parameters prevailing in an interior 9, 9', 9", 9''' of at least one process chamber 6, 6', 6", 6''' can be carried out via a process parameter unit 8, in particular the pressure and/or temperature and/or atmosphere present in the interior 9, 9', 9", 9''' of the at least one process chamber 6, 6', 6", 6''' can be controlled and/or regulated by the process parameter unit 8. The control and/or regulation can take place in this case targetedly on the at least one assembly 2 arranged in the interior 9, 9', 9", 9'''. Here the process parameter unit 8 is connected via line connections 36, 36', 36", 36''' to process parameter changing means (not shown), such as a heating device and/or cooling device, influencing the process parameters in the respective interior 9, 9', 9", 9'''. Regulation of the process parameters in the respective interior 9, 9', 9", 9''' of the process chambers 6, 6', 6", 6''' can take place targetedly to the requirements specific to the assembly via the process parameter unit 8. The process parameter setting or regulation in a first process chamber 6, 6', 6", 6''' can take place independently of the process parameter settings of another, and in particular independently of the process parameter settings of an adjacent process chamber 6, 6', 6", 6". It can thus be enabled that via the process parameter unit 8 at least a first process parameter present in the interior 9 of the first process chamber 6 can be controlled and/or regulated independently of a second process parameter prevailing in an interior 9' of a second process chamber 6'. The device adjusting the process parameters of the process chambers 6, 6', 6", 6''' in each case can be suitably effective for this purpose, so that cross-influencing by adjacent process chambers 6, 6', 6", 6''' can be compensated. Alternatively or in addition, insulation means (not shown) are arranged between adjacent process chambers 6, 6', 6", 6''', which prevent or at least reduce cross-influencing, in particular in respect of pressure and/or temperature and/or atmosphere of adjacent process chambers 6, 6', 6", 6".

The process chambers 6, 6', 6", 6''' each have at least one insertion and/or removal opening 10, 10', 11, 11', via which an assembly 2 that is to be soldered and/or has been soldered can be introduced into the process chamber 6, 6', 6", 6''' or removed from the process chamber 6, 6', 6", 6''' via an insertion and/or removal movement 12, 13. The process chambers 6, 6', 6", 6''' are typically provided with walls or wall sections, which define an interior 9, 9', 9", 9''' of the process chambers 6, 6', 6", 6". Openings are present here in the walls that form insertion and removal openings 10, 10', 11, 11'.

As shown for example in FIG. 1 or 3, the insertion movement 12 for inserting an assembly 2 into a process chamber 6 can take place parallel to the removal movement 13 for removing an, in particular this, assembly 2 from this process chamber 6, the insertion movement 12 preferably being directed in an opposite direction than the removal movement 13, cf. FIGS. 1 and 2. Alternatively, as shown in FIGS. 3 and 5, the insertion and removal movement 12, 13 can be oriented or directed in parallel and in the same direction. The said or observed direction of the insertion and removal movement can comprise here a direction projected into a horizontal plane and/or a direction projected into a vertical plane, i.e. e.g. into a vertical plane running perpendicular to the installation surface 7.

For example, the insertion movement 12 for inserting an assembly 2 into a process chamber 6 and the removal movement 13 for removing an assembly 2 from this process chamber 6 can be aligned not in parallel. In this case the insertion and removal movement 12, 13 can enclose an angle α. The angle α can be 5° to 175°, for example, preferably 30° to 150°, most preferably 60° to 120°, cf. FIG. 6, where the angle α shown by way of example from the plan view is 90°. Furthermore, other alternative or additional entry and/or exit areas are shown in FIG. 6 for removing an assembly 2 from the interior 9 of a process chamber 6, these alternative or additional entry and/or exit areas and the insertion and/or exit movements implementable for this being visualised by the arrows 47, 48 shown as dotted lines.

The at least one insertion and/or removal opening 10, 10', 11, 11' of at least one process chamber 6, 6', 6", 6''' can be closable by at least one closure element (not shown), at least in sections, in particular the at least one closure element closes the process chamber 6, 6', 6", 6''' in such a way that a temperature and/or pressure and/or atmosphere present in the interior 9, 9', 9", 9''' of the process chamber 6, 6', 6", 6''' is closed off or separated from an area outside of this process chamber 6, 6', 6" 6".

The device 1 has at least one conveying device 15 comprising at least one conveying means 14 for executing a conveying movement 16, wherein by means of the conveying means 14 an assembly 2 that is to be and/or has been soldered is transferable from a first position 17 to a first transfer position 18 associated with a first process chamber 6, 6', 6", 6''', in particular the conveying movement 16 of the conveying means 14 comprises a movement component in a vertical direction. The conveying movement 16 can have, at least in sections, an exclusive movement in a vertical direction, cf. arrow 19. The first position 17 can be e.g. a position 17 lying at the same height as an insertion opening 42 for inserting an assembly 2 into a conveying device 15 or a handling unit 30, 30', 31, 31'. The transfer position 18 is defined in FIG. 1 as the transfer position 18 assigned for transfer to the first process chamber 6. It is possible that each process chamber 6, 6', 6", 6''' has a transfer position 18, 18' associated with it, in particular corresponding roughly or exactly to its height level, which is approachable by a corresponding movement of the conveying means 14, for example according to arrow 19.

The device 1 further has at least one transfer device 21 comprising at least one transfer means 20, 20' for implementing a transfer movement 22, 23, at least in sections, wherein by means of the transfer means 20, 20' at least one assembly 2 that is to be soldered and/or has been soldered is transferable (a) from a non-working position, in particular a transfer position 18, to a first working position 24 lying in the interior 9 of a first process chamber 6 and/or (b) from a first working position 24 lying in the interior 9 of a first process chamber 6 to a non-working position, in particular a transfer position 18 and/or (c) from a first working position 24 lying in the interior 9 of a first process chamber 6 to a second working position 25, in particular a further process chamber 29, 29', the transfer movement 22, 23 preferably comprising a movement component. As shown in FIGS. 13 and 14, an exclusively horizontal first and/or second transfer movement 22, 23 can be executable. In this case the conveying means 20, 20' can be designed as conveyor belts, for example.

The first transfer movement 22 relates to a transfer of the assembly 2 from a transfer position 18 lying outside of or next to a process chamber 6, 6', 6", 6'" to an interior 9, 9', 9", 9'" of the respective process chamber 6, 6', 6", 6'" or vice versa. The second transfer movement 23 relates to a transfer of the assembly 2 from a supplying neighbouring installation 26 lying outside of the device 1 to the device 1 and/or a transfer of the assembly 2 from the device 1 to a receiving neighbouring installation 27. Here the assembly 2 can be introduced automatically from a neighbouring installation 26 (not shown) upstream of the device 1 through the insertion opening 42 into the first handling unit 30 by an insertion movement 43 and transferred, for example, to a first position 17.

Alternatively or in addition, the supply and/or the removal of an assembly 2 to and/or from the device 1 can be effected manually by a production worker.

FIG. 13 shows the second transfer movement 23, in which a supply and/or pick-up of the assembly 2 takes place from a supplying neighbouring installation 26 to the handling unit 30 or to the conveying device 15. If the assembly 2 was received completely within the handling unit 30 or within the conveying device 15 and has if applicable reached a transfer position 18 associated with a process chamber 6, 6', 6", 6'", the first transfer movement 22 from the handling unit 30 or the conveying unit 15 to the defined process chamber 6, 6', 6", 6'" or the insertion of the assembly 2 into the pertinent interior 9, 9', 9", 9'" of the process chamber 6, 6', 6", 6'" takes place. In this case, as shown in FIG. 14, for example, mobility of the transfer means 20, 20' can be provided such that the transfer means 20, 20' can protrude from the handling unit 30 or from the conveying device 15 or protrude or engage, at least in sections, in the interior 9, 9', 9", 9'" of a process chamber 6, 6', 6", 6". The transfer means 20, 20' are formed by way of example as a conveying chain and/or as a conveyor belt, on which the assembly 2 lies and the assembly 2 executes a movement by appropriate movement of the conveying chain or of the conveyor belt. If the transfer means 20, 20' protrudes, at least in sections and temporarily, into the interior 9, 9', 9", 9'" of the process chamber 6, 6', 6", 6'", it is possible to dispense with another conveying option for the assembly 2 inside the interior 9, 9', 9", 9'" of the process chamber 6, 6', 6", 6".

A transfer means 20, 20' formed as a conveyor belt can be supported movably horizontally, for example, e.g. in the manner of a drawer. Thus even a transfer means 20, 20' formed as a drawer and associated with the process chamber arrangement 5, 5', 50, 50' or arranged or formed in or on the process chamber arrangement 5, 5', 50, 50' can be loaded manually by a production worker (not shown) with an assembly 2 or an assembly 2 can be removed from the transfer means 20, 20'.

The conveying device 15 and/or the transfer device 21 are preferably arranged in a handling unit 30, wherein the handling unit 30 is connectable or connected to the process chamber arrangement 5. As shown in FIGS. 13 and 14, at least parts of the handling unit 30 (e.g. the transfer device 21) can be supported inside the handling unit 30 such that their at least temporary engagement in or extension into the volume of the process chamber arrangement 5, 5', 50, 50' is made possible.

The handling unit 30, 31 can be designed, for example, as a mobile transport system 32, in particular as a driverless mobile transport system (FTS), at least one assembly 2 that has been soldered or is to be soldered preferably being transportable by the mobile transport system 32 from a first location (not shown) remote from the device to a second location 33, 33' close to the device. According to FIG. 5, the mobile transport system 32 can be a transport medium movable by means of wheels 34, 34' on an installation area 7, which medium is suitable to transport at least (a) one, preferably several, assemblies 2 simultaneously, (b) at least one conveying device 15 and/or (c) at least one transfer device 21. In this case the conveying device 15 and/or the transfer device 21 can be connected detachably to the mobile transport system 32. In particular, the conveying device 15 and/or the transfer device 21 is connected or attached in such a way to the mobile transport system 32 that a manual and/or automatic separation of the conveying device 15 and/or the transfer device 21 from the mobile transport system 32 can be implemented, wherein the conveying device 15 and/or the transfer device 21 is/are preferably adapted to implement its intended use following separation from the mobile transport system 32 as a static device.

In the figures, the handling unit 30, 31 and the process chamber arrangement 5, 5' are each shown as separate units that are or can be connected to one another. For this purpose, the handling unit 30, 31 and the process chamber arrangement 5, 5' are each enclosed or housed by their own housing 28, 28', 35, 35', at least in sections. Alternatively or in addition, at least parts of the handling unit 30, 31 and/or parts of the process chamber arrangement 5, 5' can be enclosed, at least in sections, by a common housing (not shown) or placed in a common housing.

According to the embodiments shown in FIGS. 3 to 5, at least two handling units 30, 31, each comprising at least one conveying device 15 and/or one transfer device 21, can be connected to at least one process chamber arrangement 5, 5'. In this case, the supply of an assembly 2 that is to be soldered or has been soldered, for example, to the at least one process chamber 6, 6', 6", 6'" can take place via a first handling unit 30 and a removal of the assembly 2 that is to be soldered or has been soldered from this or another process chamber 6, 6', 6", 6'", 29, 29' can take place by a second handling unit 31.

At least one holding means (not shown), which is adapted to hold the assembly 2 that is to be soldered or has been soldered in a positive and/or frictional manner, can be arranged inside at least one process chamber 6, 6', 6", 6'" and/or on the conveying means 14 and/or on the transfer means 20, 20'. The holding means can be formed as a gripper (not shown) or as a clamping device (not shown). The function of the holding means can be implemented, for example, at least temporarily by a guide means 37, 37', 38, 38', these being able to fix the assembly 2 in a clamping manner at least temporarily, for example. Alternatively or in addition, separate holding means can be provided, which next to the guide means 37, 37', 38, 38' have a fixing function, at least temporarily, with reference to the assembly 2. For example, a manual or automatic change in the orientation and/or the position of the holding means, in particular of the guide means 37, 37', 38, 38', at least in sections, can take place to enable an adaptation to a differently geometrically designed assembly 2 and/or an adaptation to a different number of assemblies 2 to be handled or to be guided and/or fixed timewise in parallel.

Alternatively or in addition, a conveying and/or transfer means 14, 20, 20' can be provided according to FIGS. 11 and 12 which is or are adapted to guide geometrically differently formed assemblies 2 and/or components 3, 3'. Here a targeted adaptation of guide means 37, 37', 38, 38' provided from the conveying and/or transfer means side to the respective assembly 2 and/or components 3, 3' can be implemented. In this case four guide means 37, 37', 38, 38', in particular conceived in pairs, can be used, wherein the guide means 37, 37', 38, 38' are variable in respect of their spacing 39, 39'. The guide means 37, 37', 38, 38' can preferably be moved manually or automatically (e.g. computer-controlled) relative to one another, so that their spacing 39, 39' is targetedly variable. In the configuration according to FIG. 11, two assemblies 2 can be guided. According to FIG. 12, a first pair of guide means 37, 37' is in a parking position or in a non-use position, whereas the second pair of guide means 38, 38' was moved such that the guide means 38, 38' have a greater spacing 39' and consequently a larger assembly 2 can be guided by the guide means 38, 38'. Placed between the guide means 37, 37', 38, 38' are transfer means 20, 20' formed as conveyor belts. The assembly 2 lies on these transfer means 20, 20' and can be moved along the extension of the transfer means 20, 20'. Two, three or four assemblies 2 can optionally be transported simultaneously on the transfer means 20, 20', i.e. a two-, three- or four-track arrangement is optionally implementable. In this case the simultaneous movement of the assemblies 2 can take place with the process parameters at least substantially maintained.

As shown in FIG. 5, it is provided in an exemplary embodiment to connect at least two, respectively at least two process chamber arrangements 5, 5' comprising process chambers 6, 6', 6'', 6''', 29, 29' arranged above one another, in particular in a stack-like manner, to one another, the process chambers 6, 6', 6'', 6''' of the first process chamber arrangement 5 and the process chambers 29, 29' of the second process chamber arrangement preferably being aligned parallel to one another. A transfer of an assembly 2 from a process chamber 6, 6', 6'', 6''' of a first process chamber arrangement 5 to a process chamber 29, 29' of a second process chamber arrangement 5' can take place here via transfer devices 21 arranged on and/or between the process chamber arrangements 5, 5', for example analogous to the variant of the transfer device 21 or the transfer means 20, 20' shown in FIG. 14. For example, the process chambers 6, 6', 6'', 6''' of the first process chamber arrangement 5 are used to heat an assembly 2 inside the interiors 9, 9', 9'', 9''' of the first process chambers 6, 6', 6'', 6'''. In particular, heating of the assembly 2 takes place in such a way that melting of the soldering flux 4 is achieved. After leaving the first process chambers 6, 6', 6'', 6''', the assembly 2 can be transported to second process chambers 29, 29' of the second process chamber arrangement 5' associated with the first process chambers 6, 6', 6'', 6''. Active and/or targeted cooling of the assemblies 2 can take place in the interiors of the second process chambers 29, 29'.

The device can comprise at least (a) one input device for entering information at a control unit 41 on the device side, in particular a process parameter unit 8, and/or (b) an output device for outputting information to an operator and/or at a control unit 41 on the device side, in particular a process parameter unit 8. In the embodiment shown in FIGS. 8 and 9, a touch screen 40 is arranged on the device 1 that can implement the function of the input device and/or the function of the output device.

Furthermore, it is recognisable from the embodiment shown in FIG. 9 that the first and/or the second handling unit 30, 31 and/or at least one process chamber arrangement 5, 5' has a geometry or orientation that is placed head up or is upright, in particular during the intended use. Here the handling unit 30, 31 and/or at least one process chamber arrangement 5, 5' can have an at least substantially cuboid construction, which has a smaller base area than its at least one lateral face. In other words, the maximum extension in the plane of the installation surface 7 is smaller, preferably smaller by at least half, particularly preferably smaller by at least a quarter, than the maximum extension in a vertical direction or perpendicular to the installation surface 7.

The device is operated by a method for soldering an assembly 2, which provides the following method steps: (a) provision of an assembly 2, (b) insertion of an assembly 2 into an interior 9, 9', 9'', 9''' of a process chamber 6, 6', 6'', 6''', (c) carrying out a soldering method in an interior 9, 9', 9'', 9''' of at least one process chamber 6, 6', 6'', 6''', (d) removal of the assembly 2 from the interior 9, 9', 9'', 9''' of the process chamber 6, 6', 6'', 6''' after carrying out the soldering method. Optionally, following heating of the assembly 2 arranged in the interior 9, 9', 9'', 9''' of a process chamber 6, 6', 6'', 6''', which heating takes place in the course of carrying out the soldering method, the assembly can be subjected to a cooling process in the process chamber 6, 6', 6'', 6''' or following transfer of the assembly 2 to another process chamber 29, 29'.

FIG. 10 shows an exemplary construction of a handling unit 30, 31. It is recognisable here that a unit formed as a conveying device 15 and transfer device 21 is transferable vertically along the arrow 19 and horizontally along the arrow 44, in particular transversely to the main conveying direction 45 of the assembly 2 inside the device 1. The conveying means 14 is provided with conveyor-belt-like transfer means 20, 20', which enable a movement of the assembly 2 to be placed on the transfer means 20, 20' along the main conveying direction 45 of the assembly 2 inside the device. Alternatively or in addition, the transfer means 20, 20' can be formed, at least in sections, in particular in the main conveying direction 45, capable of being withdrawable in the manner of a drawer, and/or can comprise a gripper.

The device 1 can have a plurality of openings for guiding the assembly 2 into or out of a handling unit 30, 31 and/or into or out of a process chamber arrangement 5, 5'. To this end a lock-like closure mechanism (not shown) can be provided on at least one opening. The possible openings on the handling unit 30, 31 and/or on the process chamber arrangement 5, 5' are shown by dashed visualised areas 46, 46', 46'', 46''', 46''''. In other words, the areas 46, 46', 46'', 46''', 46'''' form potential locations for the respective or partial provision of a lock-like closure mechanism.

It is shown according to FIG. 7 that a first handling unit 30 is arranged on a first side of the process chamber arrangement 5 and another handling unit 31 on a side of the process chamber arrangement 5 arranged around the corner from the first handling unit 30. Here supply of the assembly 2 is performed by the first handling unit 30 and the removal of the assembly 2 by the second handling unit 31, the insertion movement 12 enclosing an angle α to the removal movement 13. Optionally or additionally, as shown by the implementation represented by the dashed and dotted line (cf. arrow 49) in FIG. 7, a movement course of the assembly 2 that is S-shaped or incremental overall can also be executed inside the device.

FIG. 15 shows a construction consisting of two similar, in particular identically constructed process chamber arrangements 5, 5', wherein only a first process chamber arrangement 5 is equipped with a touch screen 40. A first handling unit 30 is attached or connected to the first process chamber arrangement 5 and a second handling unit 31 to the second process chamber arrangement 5'. This construction is comparable to the construction shown in FIG. 5, wherein the handling units 30, 31 of the device 1 according to FIG. 15 are not formed as mobile transport systems 32.

FIG. 16 shows a plan view of a device 1 consisting of a first handling unit 30, which is connected to a first process chamber arrangement 5, and a second handling unit 31, which is connected to a second process chamber arrangement 5'. Furthermore, parallel thereto another handling unit 30' is connected to another process chamber arrangement 50 and another handling unit 31' to another process chamber arrangement 50'. Via the insertion and removal movement 12, 13 in a first line and via the further insertion and removal movement 12', 13' in a second line parallel to the first line, a movement and/or thermal impact can take place inside process chamber 6, 6', 6", 6'", 29, 29'. It is thus shown by way of example that the process chamber arrangement 5, 5', 50, 50' can be arranged behind one another and/or adjacent to one another in the main conveying direction 45. A connection can thus be provided of several process chamber arrangements 5, 5', 50, 50' and/or handling units 30, 30', 31, 31' arranged in the manner of a chessboard or matrix relative to one another. The process chamber arrangements 5, 5', 50, 50' can comprise several, in particular an identical number of process chambers 6, 6', 6", 6'", 29, 29' arranged above one another respectively inside a process chamber arrangement 5, 5', 50, 50'.

REFERENCE CHARACTER LIST

1 Device
2 Assembly
3, 3' Component
4 Soldering flux
5, 5' Process chamber arrangement
6, 6', 6", 6'" Process chamber
7 Installation surface
8 Process parameter unit
9, 9', 9", 9'" Interior
10, 10' Insertion opening of 6, 6', 6", 6'"
11, 11' Removal opening of 6, 6', 6", 6'"
12 Insertion movement
13 Removal movement
14 Conveying means
15 Conveying device
16 Conveying movement
17 First position
18 Transfer position
19 Arrow
20, 20' Transfer means
21 Transfer device
22 First transfer movement
23 Second transfer movement
24 First working position
25 Second working position
26 Supplying neighbouring installation
27 Removing neighbouring installation
28, 28' Housing of 5, 5'
29, 29' Other process chamber
30, 30' First handling unit
31, 31' Second handling unit
32 Mobile transport system
33 Location near the device
34, 34' Wheel
35, 35' Housing of 30, 31
36, 36', 36", 36'" Line connection
37, 37' Guide means
38, 38' Guide means
39, 39' Spacing
40 Touch screen
41 Control unit
42 Insertion opening
43 Insertion movement
44 Arrow
45 Main conveying direction
46, 46', 46", 46'", 46'''' Opening
47, 47', 47" Arrow
48, 48' Arrow
49 Arrow
50, 50' Third, fourth process chamber arrangement

The invention claimed is:

1. A device for soldering of at least one assembly, having a process chamber arrangement, comprising at least two process chambers for preparing a soldering method and/or for carrying out a soldering method and/or for post-processing a soldering method, wherein the at least two process chambers are arranged above one another, comprising:
a handling unit including at least one transfer device, the at least one transfer device comprising at least one transfer means for executing a transfer movement, wherein by means of the transfer means at least one assembly that is to be soldered and/or has been soldered is transferable
from a non-working position to a first working position lying in an interior of a first process chamber, and/or
from a first working position lying in the interior of the first process chamber to the non-working position, and/or
from the first working position lying in the interior of the first process chamber to a second working position,
wherein the transfer means is movably supported such that the transfer means can protrude or protrudes at least in sections temporarily into an interior space of the process chamber,
wherein the process chamber arrangement is arranged on a first side of the device and the handling unit is arranged on a second side of the device, and
wherein the at least one assembly to be soldered is inserted into the handling unit from a location outside the device via the second side of the device and the at least one assembly that has been soldered is removed from the handling unit to the location outside the device via the second side of the device.

2. The device according to claim 1, wherein due to at least one process parameter unit, control and/or regulation of process parameters present in an interior of at least one process chamber of the at least two process chambers can be implemented, wherein a pressure and/or temperature and/or atmosphere present in the interior of the at least one process chamber can be controlled and/or regulated by the process parameter unit.

3. The device according to claim 1, wherein, via a process parameter unit, at least a first process parameter present in the interior of a first process chamber of the at least two process chambers can be controlled and/or regulated independently of a second process parameter present in an interior of a second process chamber of the at least two process chambers.

4. The device according to claim 1, wherein the at least two process chambers each have at least one insertion and/or removal opening via which an assembly that is to be soldered and/or has been soldered is insertable into the process chambers or removable from the process chambers via an insertion and/or removal movement.

5. The device according to claim 4, wherein the insertion movement for inserting an assembly into a process chamber of the at least two process chambers takes place parallel to the removal movement for removing an assembly from this process chamber, the insertion movement being directed in the opposite direction than the removal movement.

6. The device according to claim 4, wherein the insertion movement for inserting an assembly into a process chamber of the at least two process chambers and the removal movement for removing an assembly from this process chamber are not aligned in parallel.

7. The device according to claim 4, wherein the at least one insertion and/or removal opening of at least one process chamber of the at least two process chambers is or are closable by at least one closure element, at least in sections, wherein the at least one closure element closes the at least one process chamber such that a temperature and/or pressure and/or atmosphere present in the interior of the at least one process chamber is closed off from an area outside of this process chamber.

8. The device according to claim 1, further comprising at least one conveying device comprising at least one conveying means for executing a conveying movement, wherein by means of the at least one conveying means an assembly that is to be soldered and/or has been soldered is transferable from a first position to a first transfer position associated with a first process chamber of the at least two process chambers, wherein the conveying movement of the conveying means comprises a movement component in a vertical direction.

9. The device according to claim 1, wherein the transfer movement comprises a movement component in a horizontal direction.

10. The device according to claim 8, wherein the conveying device is or are arranged in the handling unit, wherein the handling unit is connectable or connected to the process chamber arrangement.

11. The device according to claim 10, wherein the handling unit is designed as a mobile transport system, wherein at least one assembly that is to be soldered or has been soldered is transportable by the mobile transport system from a first location remote from the device to a second location close to the device.

12. The device according to claim 10, wherein parts of the handling unit and/or parts of the process chamber arrangement are enclosed, at least in sections, by a common housing.

13. The device according to claim 8, further comprising at least two handling units each comprising the at least one conveying device connectable or connected to the process chamber arrangement, a supply of the assembly that is to be soldered or has been soldered takes place to the first process chamber via a first handling unit and removal of the assembly that is to be soldered or has been soldered from the first process chamber takes place via a second handling unit.

14. The device according to claim 1, wherein arranged inside the at least two process chambers is at least one holding means, which is adapted to hold in a positive and/or frictional manner the assembly that is to be soldered or has been soldered.

15. The device according to claim 1, further comprising at least two process chamber arrangements each comprising at least two process chambers arranged above one another are connected to one another, with the process chambers of a first process chamber arrangement and the process chambers of a second process chamber arrangement being aligned parallel to one another.

16. The device according to claim 1, further comprising:
an input device for entering information at a control unit on a device side, and/or
an output device for outputting information to an operator and/or to a control unit on the device side.

* * * * *